United States Patent [19]

Albert et al.

[11] 4,430,894

[45] Feb. 14, 1984

[54] ADJUSTABLE FLUID RESISTORS FOR USE IN AN INTEGRATING ACCELEROMETER

[75] Inventors: William C. Albert, Boonton; Bart J. Zoltan, Old Tappan, both of N.J.

[73] Assignee: The United States of America as represented by the Secretary of the Air Force, Washington, D.C.

[21] Appl. No.: 343,059

[22] Filed: Jan. 27, 1982

[51] Int. Cl.³ ............................................. G01P 15/00
[52] U.S. Cl. ...................................... 73/497; 188/278
[58] Field of Search ................ 73/490, 497, 503, 515, 73/516 R; 188/278, 309, 310, 313, 318; 138/46

[56] References Cited

U.S. PATENT DOCUMENTS

| | | | |
|---|---|---|---|
| 2,119,250 | 5/1938 | Smith | 138/46 |
| 2,332,994 | 10/1943 | Draper et al. | 73/497 |
| 2,402,729 | 6/1946 | Buchanan | 138/46 |
| 2,778,623 | 1/1957 | Statham | 264/1 |
| 3,001,406 | 9/1961 | Oyhus | 73/497 |
| 3,090,238 | 5/1963 | Stedman | 73/515 |
| 3,132,520 | 5/1964 | Wing | 73/490 |
| 3,137,175 | 6/1964 | Jamgochian | 73/503 |
| 3,239,620 | 3/1966 | Albert | 200/61.45 |
| 3,267,740 | 8/1966 | Stedman | 73/497 |
| 3,453,457 | 7/1969 | Hayer et al. | 310/8.4 |
| 3,481,204 | 12/1969 | Albert | 73/490 |
| 3,771,368 | 11/1973 | Albert | 73/503 |

Primary Examiner—James J. Gill
Attorney, Agent, or Firm—Donald J. Singer; Stanton E. Collier

[57] ABSTRACT

An improved integrating accelerometer having a plurality of proof masses adapted to move relative to a casing in response to accelerations of the casing, a temperature compensated damping mechanism, and fluid resistors for extending the temperature operating range and for calibrating.

5 Claims, 7 Drawing Figures

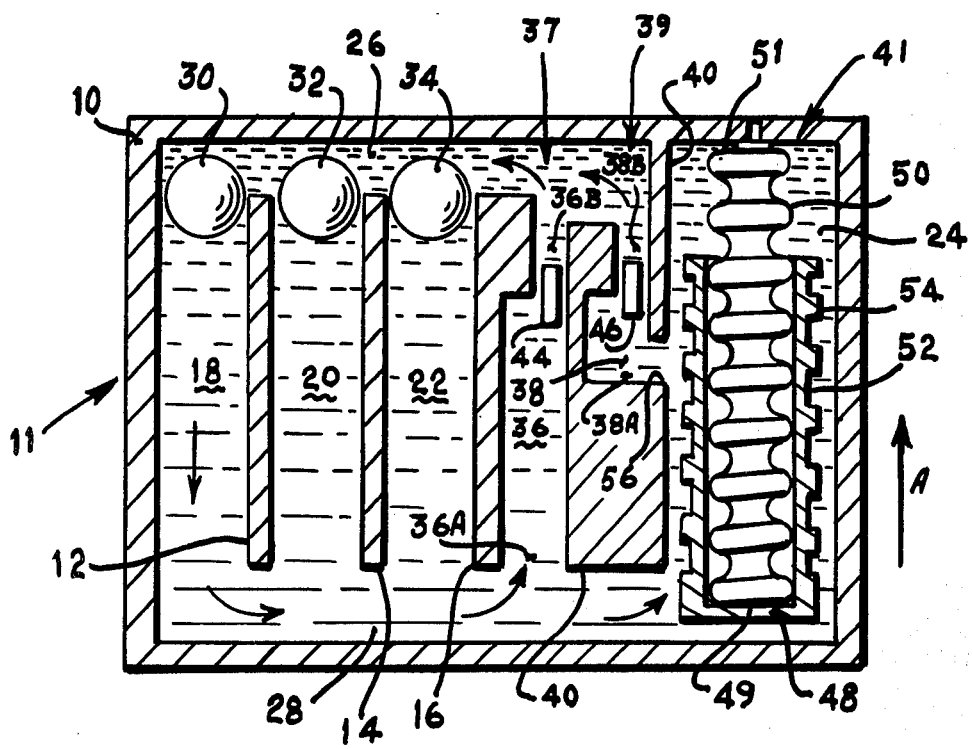
FIG. 1
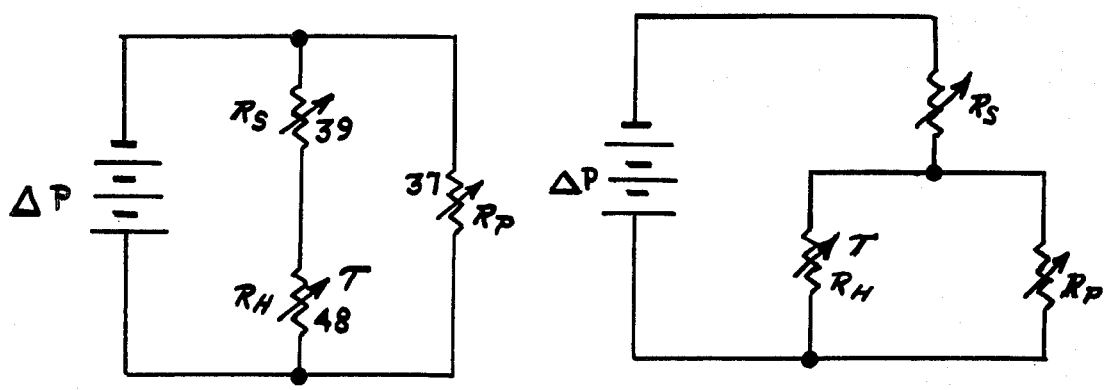
FIG. 1A
FIG. 1B

ADJUSTABLE FLUID RESISTORS FOR USE IN AN INTEGRATING ACCELEROMETER

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to an improved accelerometer, and more particularly, to fluid resistors for making additional adjustments to a temperature compensated damping mechanism in the improved accelerometer.

2. Description of the Prior Art

An integrating accelerometer having a temperature compensated damping device incorporated therein is disclosed in U.S. Pat. No. 3,771,368, issued Nov. 13, 1973 to this inventor, and is incorporated herein by reference. This damping device has a helix member fixed on one end of a bellows and the opposite end of the bellows attached to an inner wall of a casing. This damping device provides a substantially constant damping coefficient by the expansion or contraction of the bellows in response to corresponding changes in the fluid volume in the casing due to temperature variations. The expansion or contraction of the bellows moves the helix member within the casing to change the length of the effective flow path. For example, the longer the effective flow path the greater the resistance to fluid flow. This longer path counteracts the decrease in viscosity due to a higher temperature. A lower temperature decreases the effective path length required to maintain a constant damping coefficient. This damping device is located within the accelerometer and is substantially effective in eliminating temperature variations over a wider range as an unwanted variable.

Additional adjustments to the above damping device are accomplished by the following: (1) varying the internal fluid amount to change the bellows stroke with temperature, and (2) changing the axial location of the helix.

As to the first method, fluid can be either added or subtracted from the casing. For example, by adding fluid, the bellows are compressed so that the effective flow path is increased. As to the second method, the volume can be adjusted by a piston device. For example, the piston can be moved into the fluid volume so that the bellows are compressed. This causes the helix to move axially thus changing the effective flow path.

The above methods of changing the effective flow paths to obtain constant damping over a range of temperatures have proved not to be as effective as desired.

SUMMARY OF THE INVENTION

The present invention overcomes the limitations encountered in the prior devices and described hereinabove by incorporating fluid resistors in series and parallel with the helix of the temperature compensated damping device used within an accelerometer. The fluid resistors are capable of providing fine adjustment to the fluid flow paths.

The improved accelerometer includes a casing having a plurality of passage therein, a proof mass disposed in each of the passages, a temperature compensated damping device, fluid resistors operably connected in series and in parallel with the temperature compensated damping device, and means responsive to a predetermined movement of each of the proof masses for generating an output.

One object of this invention is to provide for constant damping over a wider operating temperature range within an accelerometer.

Another object of this invention is to provide for improved unit-to-unit scale factor interchangeability within an accelerometer.

A still further object of this invention is to provide additional adjustment of the temperature compensated damping device during calibration thereof.

Other objects, advantages, and novel features of the invention will become apparent from the following detailed description of the invention when considered in conjunction with the accompanying drawings.

BRIEF DESCRIPTION OF THE DRAWINGS

FIG. 1 is a diagramatic view illustrating the operational theory of the improved accelerometer of the present invention;

FIG. 1A is a fluid schematic diagram of the improved accelerometer of FIG. 1;

FIG. 1B is an alternative fluid schematic diagram of the improved accelerometer of FIG. 1A.

DESCRIPTION OF THE PREFERRED EMBODIMENT

Figure 2:
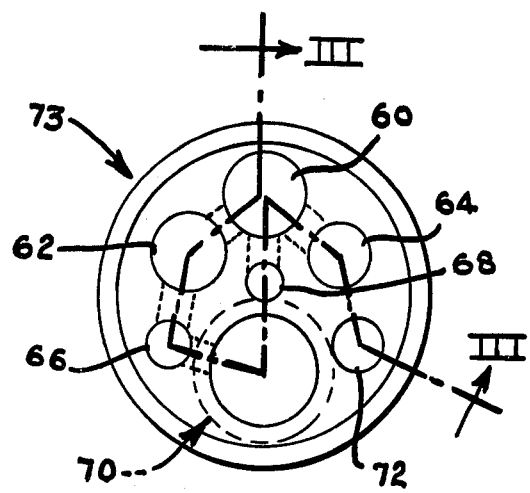
FIG. 2 is a plan view of a preferred embodiment of the accelerometer of the present invention.

A plurality of fluid resistors of this invention are operably connected to the multi-output integrating accelerometer disclosed in U.S. Pat. No. 3,771,368, issued Nov. 13, 1973 to this inventor and which is incorporated herein by reference.

The fluid resistor of this invention is essentially a plug having a fluid channel therein, located for reciprocal movement in a casing having a bore for the plug. The fluid resistors are connected in series and parallel with the temperature compensated damping device of the integrating accelerometer disclosed in the above-mentioned patent.

To better understand how the present invention is incorporated into the multi-output integrating accelerometer, reference is made to FIG. 1. The device of FIG. 1 is used for teaching the principles of this invention. A preferred embodiment is discussed after this introduction.

As shown in FIG. 1, accelerometer 11 has a casing 10 with partitions 12, 14, 16 and 40 formed therein which divide casing 10 into a plurality of passages 18, 20, 22, 24, 36, and 38 extending in a vertical direction, as viewed in FIG. 1. A plurality of passages 26, 28, and 56 are also formed therein which extend in a horizontal direction and communicate with the vertical passages.

Partitions 12, 14, 16, and 40 are shown as wall-like members in FIG. 1 and are configured such that vertical passages 18, 20, 22, and 24 are in the form of cylindrical bores. Vertical passages 36 and 38 have lower vertical passages 36A and 38A and upper vertical passages 36B and 38B. These passages are typically cylindrical bores.

The lower vertical passages 36A and 38A are of substantially larger inside diameter than the upper vertical passages 36B and 38B such that there is no restriction of fluid flow up to the interface between the lower and upper vertical passages. Plugs 44 and 46 are located in the upper vertical passages 36B and 38B and extend into the lower vertical passages 36A and 38A a predetermined amount. The outside diameter of each of plugs 44 and 46 is substantially equal to, but slightly less than, the inside diameter of upper vertical passages 36B and 38B, respectively, such that fluid flows only through a channel formed therein. The effective channel length, causing fluid restriction, is determined by the lengths of plugs 44 and 46 extending into upper vertical passages 36B and 38B. It being understood that the combination of the lower vertical passages, upper vertical passages, and plugs located therebetween act as fluid resistors 37 and 39.

A plurality of proof masses 30, 32, and 34, each in the form of a spheroid, are disposed in passages 18, 20, and 22, respectively. The diameter of each proof mass 30, 32, and 34 is substantially equal to, but slightly less than, the cross sectional diameter of their respective bores 18, 20, and 22.

Proof masses 30, 32, and 34 are shown in their inoperative position in FIG. 1, that is, in the upper portion of casing 10. As will be explained in greater detail in the preferred embodiment, means are provided to normally bias the proof masses into these positions until a predetermined acceleration of casing 10 is obtained.

For the purposes of this example, it is understood that proof masses 30, 32, and 34 are formed of different materials so that proof mass 30 has a greater mass than proof mass 32, and that the latter has a greater mass than proof mass 34. In this manner, the proof masses will respond differently to accelerations of casing 10 in the direction indicated by the arrow "A" in FIG. 1 as a result of different forces acting thereon, each force being due to the product of the mass of the particular proof mass times the acceleration of casing 10.

If a contact switch, (not shown) or other similar device, is provided in the lower portion of passages 18, 20 and 22, they will be contacted by proof masses 30, 32, and 34, respectively, upon a predetermined acceleration of casing 10 being attained, thus enabling corresponding outputs of predetermined velocity levels to be produced.

The forces acting on proof masses 30, 32, and 34 as a result of casing 10 accelerations are not only directly proportional to the mass of the respective proof mass, but are proportional to the cross-sectional areas of the proof masses. Therefore, if the cross-sectional areas of the proof masses are varied, the proof masses would respond differently to different accelerations, despite the fact that they have equal masses. For the purposes of illustrating this operation, the proof masses of the teaching embodiment of FIG. 1 are shown to be of the same size, and are assumed to have different masses.

A damping medium, preferably in the form of a viscous fluid, is disposed in casing 10 and in each of the passages. Because the viscosity of the fluid changes with temperature a temperature compensated damping device 41 is located within vertical passage 24.

The operation and design of temperature compensated damping device 41 is clearly explained in U.S. Pat. Nos. 3,239,620 issued Mar. 8, 1966 and 3,481,204, issued Dec. 2, 1969 to this inventor and are incorporated herein by reference.

Temperature compensated damping device 41 performs two functions: (1) aids in damping the movement of the proof masses 30, 32 and 34 by restricting the flow of fluid displaced, to an extent that the movement and the resulting integrations can be controlled to a precise degree; and (2) compensates for viscosity changes as a result of temperature. A restricted flow passage for the fluid displaced is provided by means of helix 48 disposed in casing 10 and having a continuous helical groove 52 formed on the outer surface of helix 48. Groove 52 cooperates with partition 40 and casing 10, respectively, to define a restricted passage 54 therebetween which performs the first function noted hereinabove.

The temperature compensation is accomplished by bellows 50 and helix 48. Since the damping coefficient on a proof mass is directly proportional to the viscosity of the fluid times the length of its flow path, it can be appreciated that compensation must be made for changes in the viscosity of the fluid due to temperature variations in order to maintain a substantially constant damping coefficient. In order to achieve this, helix 48 is fixed relative to an end 49 of bellows 50 which is attached at its other end 51 to the inner wall of casing 10. In this manner, expansion or contraction of bellows 50 in response to corresponding changes in the volume of the fluid in casing 10 due to temperature variations will cause a corresponding movement of helix 48 and a change in the length of groove 52 between horizontal passages 26 and 56. As result, a substantially constant damping coefficient for the fluid is maintained.

Integrating accelerometer 11 begins operation upon a predetermined acceleration being attained by casing 10 of a magnitude that exceeds the biasing force on proof masses 30, 32, and 34. As the acceleration increases, proof mass 30 will be first to respond to the force thereon as a result of the product of mass times acceleration, since it has the greatest mass. Thus it will initially move in passage 18 and perform an input acceleration integration. In this movement, proof mass 30 displaces fluid through passage 18. This creates a differential fluid pressure, $\Delta P$, and a resulting force equal to the product of the fluid pressure differential times the cross-sectional area of proof mass 30 across passage 18. This latter force is equal in magnitude to the force as a result of the mass of proof mass 30 times the acceleration, but greater than the force as a result of the mass of proof mass 32 times the acceleration, and greater than the force as a result of the mass of proof mass 34 times the acceleration.

Since the force equal to the fluid pressure differential across proof mass 30 times the cross-sectional area of proof mass 30 acts in a direction opposite to the direction of the force as a result of the mass of proof mass 32 times the acceleration, and the mass of proof mass 34 times the acceleration, proof masses 32 and 34 will remain in the position shown in FIG. 1 until the proof mass 30 comes to a stop as a result of its engaging the inner wall of casing 10 at the lower portion of passage 18. This relieves the pressure differential across proof mass 30 and the above-mentioned forces against proof masses 32 and 34. Since proof mass 32 has a greater mass than proof mass 34, proof mass 32 will immediately begin its downward movement, creating a force acting on proof mass 34 equal to the product of the fluid pressure differential across proof mass 32 and the cross-sectional area of the proof mass 32. For the same reasons described above the latter force will maintain proof mass 34 in the position shown in FIG. 1 until proof mass 32 comes to a stop as a result of its engaging the inner wall of the casing 10, at which time proof mass 34 will begin its movement. As a result, sequential input acceleration integrations are achieved.

The effect of the fluid pressure differential, ΔP, parallel resistor 37 ($R_P$), series resistor 39 ($R_S$) and helix resistance 48 ($R_H$) is schematically shown in FIG. 1A.

For purposes of definition, $R_H$ 48 is the helix resistance that varies with temperature through bellows 50 action; $R_S$ 39 is an externally adjustable resistance in series with $R_H$ 48. $R_p$ 37 is an externally adjustable resistance in parallel with both $R_H$ 48 and $R_S$ 39. The total resistance R is the eqivalent resistance of the series parallel combination.

At or near a minimum temperature (T-min), the resistance of $R_S$ 39 and $R_H$ 48 is low because the fluid viscosity is high and by design, the primary flow resistance is $R_S$ 46 as compared to $R_H$ 48. Also by design, a very negligible amount of fluid flows through $R_P$ 37 and its effect can be ignored at or near the minimum operating temperature. If the effect of $R_p$ 37 is neglected, then at T-min, a one percent change in $R_S$ 39 produces a one percent change in the total resistance R. The effect of a $\Delta R_S$ change on the total R at any temperature T above T-min is governed by equation 1:

$$\left[\frac{\Delta R}{R_T}\right] = \frac{\Delta R_S}{R_S} \cdot \frac{\mu_T}{\mu_{T-min}} \quad (1)$$

Since $\mu_T$ decreases with increasing temperature, the effect of a given $R_S$ diminishes with increasing temperature, thus an adjustable series resistance, such as $R_S$ 39, is most effective at the lower end of the temperature range.

At or near the maximum operating temperature, the effect of a $\Delta R_p$ change on total R at any temperature T is governed by Equation 2:

$$\left[\frac{\Delta R}{R_T}\right] = \frac{\Delta R_p}{R_p} \cdot K_p \cdot \frac{\mu_T - max}{\mu_T} \quad (2)$$

$K_p$ is a design ratio of parallel flow to total flow at T-max. The upper limit of the design goal operating temperature range. Since $\mu_T$ increases with decreasing temperature, the effect of a given $R_p$ diminishes with decreasing temperature. An adjustable parallel resistance, $R_P$ 48, is most effective at the upper end of the temperature range.

An alternative arrangement of the series-parallel combination is as shown in FIG. 1B.

Figure 3:
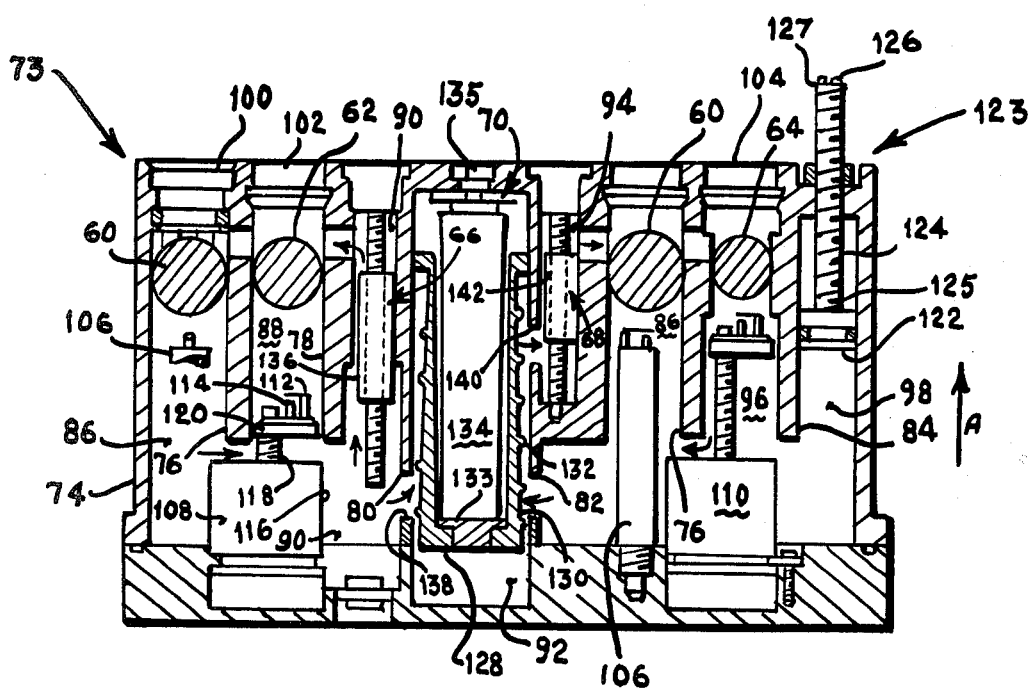
FIG. 3 is an unfolded section taken along lines III—III of FIG. 2.

As to the preferred embodiment of this invention, FIGS. 2 and 3 illustrate a multi-output integrating accelerometer 73 having two fluid resistors 66 and 68, resistor 68 in series and resistor 66 in parallel to temperature compensated damping device 70.

FIG. 2 shows a plan view of accelerometer 73 and the relative positions of proof masses 60, 62, and 64; parallel fluid resistor 66 and series fluid resistor 68; temperature compensated damping device 70; and volume adjusting means 72. The dotted lines in FIG. 2 indicate fluid passages.

Referring to FIG. 3 which is an unfolded section taken along lines III—III of FIG. 2, the operative features of this invention are functionally revealed. One should closely correlate FIG. 2 to FIG. 3 to understand the cooporation between the elements of the invention. Proof mass 60 is shown twice since the section line crosses it twice so as to show adjacent features.

Referring specifically to FIG. 3, a casing 74 is provided having a plurality of partitions 76, 78, 80, 82, and 84 formed therein to define a plurality of vertical fluid passages 86, 88, 90, 92, 94, 96, and 98. The vertical lengths of partitions 76, 78, 80, 82, and 84 are less than the interior vertical height of casing 74 as viewed in FIG. 3, so that passages 86, 88, 90, 92, 94 and 96 fluidly communicate with one another both at their upper and lower ends except for passage 98, as shown.

Proof masses 60, 62, and 64 are positioned in passages 86, 88, and 96, respectively. Each proof mass is in the form of a spheroid, with the size of proof mass 64, being less than that of proof mass 62, and the size of proof mass 62 being less than that of proof mass 60. The relationship of the proof mass cross-section to the respective cylindrical bore is the same as noted above. In the teaching embodiment of FIG. 1, the spheroids were of the same diameter but different masses. In the preferred embodiment, the spheroids are of equal mass but have different diameters. The principle of operation of accelerometer 73 being the same.

A plurality of biasing members 100, 102, and 104 extend in the upper wall of casing 74 and project into passages 86, 88, and 96, respectively. Biasing members 100, 102 and 104 are adapted to hold proof masses 60, 62, and 64 in their non-operative positions as shown in FIG. 3 until a predetermined casing acceleration is attained. Preferably, the biasing members are in the form of permanent magnets, and the proof masses of a material that is attracted thereto.

Three contact devices 106, 108, and 110 are positioned in the passages 86, 88, and 96 and are normally spaced from the proof masses 60, 62, and 64, respectively, in the inoperative position of the latter. As shown by way of example in connection with contact device 108, each device includes a movable L-shaped contact member 112 and a fixed contact member 114 normally spaced therefrom. Upon being contacted by the downwardly moving proof mass 62, contact member 112 is adapted to move towards contact member 114 and contact same. Since these contact devices 106, 108, and 110 are of a conventional design, they will not be described in any further detail, it being sufficient to say that they can be electrically connected in a circuit that will be completed upon contact of the contact members 112 and 114 to provide an output corresponding to a predetermined level of acceleration.

An apparatus for positioning contact device 108 in casing 74 is provided, and includes a drive member 116 disposed in casing 74 and adapted to rotate a lead screw 118. A carriage 120, having an internally threaded bore (not shown) in threaded engagement with lead screw 118, is adapted for vertical movement relative to the casing 74 in response to rotation of lead screw 118.

Contact member 112 is mounted on carriage 120 so that the former may be precisely located a predetermined distance from proof mass 62 in the inoperative position of the latter. It is understood that drive member 116 may include a gear system for drivingly connecting an energy source, such as a stepper motor, to lead screw 118 and also may include a pick-off to determine the exact position of the lead screw and therefore carriage 120.

Although not shown in FIG. 3 for convenience of presentation, it is understood that the contact devices 106 and 110 may also be adjusted in their respective passages by means of a positioning apparatus identical to the apparatus described immediately above.

A volume adjusting means 123, noted in the background of the prior art, is positioned in passage 98. A piston 122 is fixedly mounted to an end 125 of a threaded shaft 124. Piston 122 slidably contacts the walls of passage 98 so that as shaft 124 is turned, piston 122 forces fluid out or into passage 98. An adjustment slot 126 is machined in an end 127 of shaft 124 to facilitate rotation of shaft 124 so as to cause piston 122 to reciprocate in passage 98 in a desired manner.

Casing 74 contains a damping medium preferably in the form of a viscous fluid. A restricted flow passage for the fluid is provided by means of a hollow cylindrical member 128 disposed in the casing 74 and having a continuous helical groove 130 formed in outer surface thereof. This groove cooperates with partitions 80 and 82, respectively, to define a restricted passage 132 therebetween.

Since the damping coefficient on the proof mass is directly proportional to the viscosity of the fluid times the length of its flow path, it can be appreciated that compensation must be made for changes in the viscosity of the fluid due to temperature variations in order to maintain a substantially constant damping coefficient. In order to achieve this, cylindrical member 130 is fixed relative to an end 133 of a bellows 134 (shown schematically) which is attached at an end 135 to the inner wall of the casing 74. In this manner, expansion or contraction of bellows 134, in response to corresponding changes in the volume of the fluid in the casing 74 due to temperature variations, will cause a corresponding movement of cylindrical member 130 and a change in the length of the effective flow path 132. As a result, a substantially constant damping coefficient for the fluid is maintained.

Two fluid resistors 66 and 68 are operably connected to multi-output integrating accelerometer 73 so that fine adjustments affecting operating temperature range can be accomplished. Parallel fluid resistor 66 and series fluid resistor 68 are positioned in passages 90 and 94 respectively.

As to parallel fluid resistor 66, fluid entering the lower end of passage 90 can either go through resistor plug 136 or through horizontal passage 138 to passage 92 wherein temperature compensated damping device 70 is positioned. Fluid going through resistor plug 136 returns to source of fluid pressure. Fluid going through temperature compensated damping device 70 exits passage 92 through horizontal passage 140 in partition 82 to enter passage 94. This fluid then passes through series resistor plug 142 and returns also to the source of fluid pressure. Parallel and series fluid resistors 66 and 68 are configured according to fluid schematic of FIG. 1A.

Figure 4:
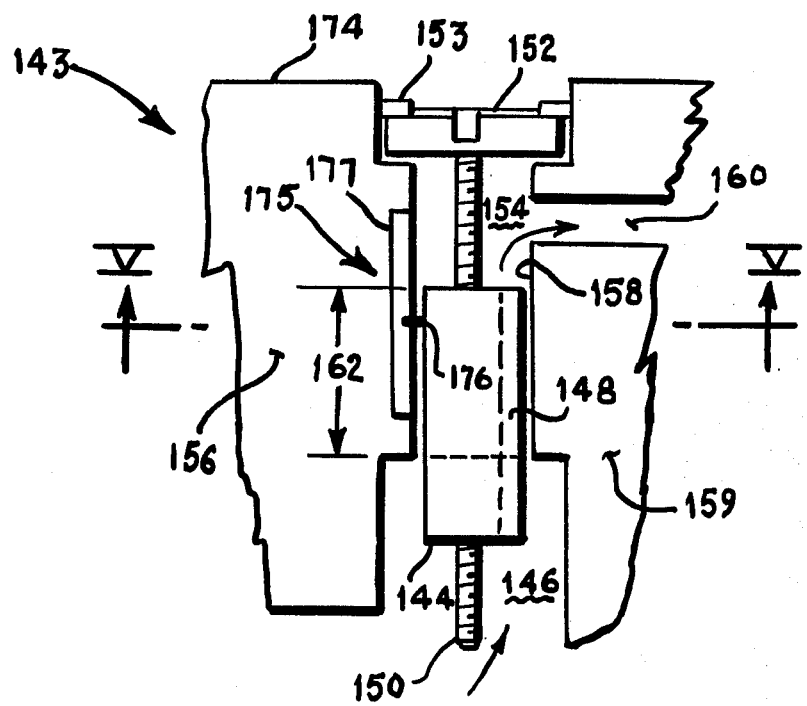
FIG. 4 is a side view of a fluid resistor of this invention.
Figure 5:
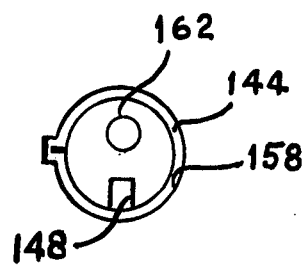
FIG. 5 is a cross sectional view of the fluid resistor of this invention taken through lines V—V of FIG. 4.

Fluid resistors 66 and 68 are constructed essentially the same except for the passages into which the resistors are confined. FIGS. 4 and 5 show one embodiment of a fluid resistor 143.

Referring to FIG. 4, fluid resistor 143 is shown within casing 174. Casing 174 has partitions 156 and 159 formed therein which form a vertical passage 158. Vertical passage 158 can be a cylindrical bore having a diameter slightly larger than a plug 144 positioned in the bore. Plug 144 is mounted on a threaded shaft 150 so that as shaft 150 is rotated, plug 144 reciprocates in passage 158. If passage 158 is a cylindrical bore, a restraining means 175 stops plug 144 from rotating when shaft 150 is rotated. This makes plug 144 reciprocate on shaft 150. Restraining means 175 can include a guide pin 176 attached to plug 144 and a guide channel 177 into which guide pin 176 translates. Slotted adjusting means 152 is mounted in casing 174 and has a fluid seal 153 to prevent the escape of fluid from passage 158 to the exterior of casing 174.

The effective fluid path length is defined as length 162. Length 162 is increased by raising plug 144. The longer the effective fluid path length the greater the resistance. In order to allow fluid to flow past plug 144, a groove 148 is formed in plug 144. Groove 148 runs the length of plug 144 and is rectangular-shaped in cross section as shown in FIG. 5. Groove 148 need not be rectangular, but could be a section off of plug 144, semi-circular, or pie shaped, for example.

In operation, fluid enters a lower passage 146 that offers no restriction to fluid flow. This fluid then enters groove 148 and flows through length 162 to enter an upper passage 154. The fluid exits passage 154 through a horizontal passage 160. This particular resistor can be used either as a parallel or series resistor depending on the operable connections to passage 146 and 160.

OPERATION OF PREFERRED EMBODIMENT

In operation, and assuming an acceleration of the casing 74 in a direction indicated by the arrow "A" in FIG. 3, biasing members 100, 102, and 104 normally maintain proof masses 60, 62, and 64 in their inoperative positions as shown in FIG. 3 until casing 74 attains a predetermined minimum acceleration. Assuming the biasing forces of biasing members 100, 102, and 104 are equal, and that the masses of proof masses 60, 62, and 64 are equal, the only different forces acting on the latter will be the forces caused by the pressure of the damping fluid in casing 74 acting on each proof mass. Since proof mass 64 has a smaller cross-sectional area across the width of its passage 96 than proof masses 60 and 62, the above force is less with respect to proof mass 64 than with respect to proof masses 60 and 62. As a result, proof mass 64 will be the first to move downwardly in casing 74 in response to increasing acceleration of casing 74. This movement of proof mass 64 will continue until it contacts contact member of contact device 110 and thus completes a circuit that will give an output in response to the accelerations of casing 74 at that instant. During the movement of the proof mass 64, a force acting on proof masses 60 and 62 will be created which is equal to the differential fluid pressure across proof mass 64 times the cross-sectional area of proof masses 60 and 62, and which is sufficient to maintain proof masses 60 and 62 in contact with biasing members 100 and 102, respectively. Upon contact of the proof means 64 with contact device 110, this force is relieved and, since proof mass 62 has a cross-sectional area less than that of proof mass 60, proof mass 62 will begin its movement.

As proof mass 64 descends passage 96, fluid is forced to flow into passages 86 and 130. From passage 130, the fluid flows through passage 92 having temperature compensated damping device 70 to passage 94 having series resistor 68 therein and back to passage 96. Alternatively, the fluid can flow from passage 86 to passage 88 to passage 90. The fluid can then flow through parallel resistor 66 or through passage 138 to passage 92 having temperature compensated damping device 70 therein. By adjusting the effective flow paths in parallel and series resistors 66 and 68, the operating temperature range is extended as noted in the above discussion.

Of course, under actual practice, proof masses of the same material and of a different size will have a different mass. Therefore, both of the above-mentioned forces will be applied to the proof masses, i.e., the force as a result of the mass of the proof mass times the acceleration and the force of the proof mass as a result of differential pressure across the proof mass times its cross-sectional area. It is apparent from the foregoing that the accelerometer of the present invention is easily adaptable to these multiple parameters.

Variations may be made in the foregoing without departing from the scope of the invention. For example, although three proof masses are shown by means of example, it can be appreciated that any number of proof masses can be provided.

Of course, other variations of the specific construction and arrangement of the accelerometer, disclosed above can be made by those skilled in the art without departing from the invention as defined in the appended claims.

What is claimed is:

1. An improved multi-output integrating accelerometer comprising:
    a case with a plurality of vertical passages and a plurality of horizontal passages defining a closed void within said case, said vertical and said horizontal passages interconnected in a predetermined manner;
    a damping fluid disposed in said case and said passages;
    a proof mass disposed in a plurality of said vertical passages, said vertical passages having said proof masses therein being proof mass passages, each of said proof masses translating through said proof mass passages in response to an external acceleration, only one of said proof masses translating at any one time, said proof mass passages connected in parallel by said horizontal passages;
    means responsive to a predetermined movement of each of said proof masses for generating an output indicative of said external acceleration, said responsive means fixedly mounted in said proof mass passages;
    a temperature compensated damping device for maintaining a substantially constant damping coefficient of said damping fluid disposed in said case and said passages, said damping device mounted in one of said vertical passages wherein the bottom of said vertical passage having said damping device receives said damping fluid from said proof mass passages through said horizontal passages;
    a volume adjusting device mounted in one of said vertical passages, said volume adjusting device being adjustable from the exterior of said case, said volume adjusting device changing an effective path length of said damping device by the movement of a piston in said volume adjusting device; and
    a pair of externally adjustable fluid resistors mounted in said vertical passages, said fluid resistors extending the temperature operating range and allowing for fine adjustment of said accelerometer.

2. An improved multi-output integrating accelerometer as defined in claim 1 wherein a first fluid resistor of said pair is connected in parallel with said damping device and a second fluid resistor of said pair is connected in series with said damping device and said first fluid resistor, said resistors being mounted in two of said vertical passages.

3. An improved multi-output integrating accelerometer as defined in claim 2 wherein said resistor comprises:
    means for resisting the flow of said damping fluid and means for adjusting fluid resistance of said resisting means, said resisting means including a plug having a groove formed therein, said groove allowing fluid communication between the top and the bottom of said vertical passage into which said resistor is mounted, said plug being in threaded engagement with said adjusting means and said plug slidably contacting said vertical passage in which mounted, said plug and said case having restraining means so that as said adjusting means is rotated said plug reciprocates without rotation, and said adjusting means including a threaded shaft, said shaft being in threaded engagement with said plug, an adjustment device attached to said shaft, said adjustment device located in said case wherein external adjust of said adjustment device rotates the threaded shaft so that said plug reciprocates thereon.

4. An improved multi-output integrating accelerometer as defined in claim 1 wherein a first fluid resistor of said pair is connected in series with said damping device and a second fluid resistor of said pair is connected in parallel with said damping device and said first fluid resistors, said resistor being mounted in two of said vertical passages.

5. An improved multi-output integrating accelerometer as defined in claim 4 wherein said resistor comprises:
    means for resisting the flow of said damping fluid and means for adjusting fluid resistance of said resisting means, said resisting means including a plug having a groove formed therein, said groove allowing fluid communication between the top and the bottom of said vertical passage into which said resistor is mounted, said plug being in threaded engagement with said adjusting means and said plug slidably contacting said vertical passage in which mounted, said plug and said case having restraining means so that as said adjusting means is rotated said plug reciprocates without rotation, and said adjusting means including a threaded shaft, said shaft being in threaded engagement with said plug, an adjustment device attached to said shaft, said adjustment device located in said case wherein external adjust of said adjustment device rotates the threaded shaft so that said plug reciprocates thereon.

* * * * *